US006996713B1

(12) United States Patent
Trimberger

(10) Patent No.: US 6,996,713 B1
(45) Date of Patent: Feb. 7, 2006

(54) METHOD AND APPARATUS FOR PROTECTING PROPRIETARY DECRYPTION KEYS FOR PROGRAMMABLE LOGIC DEVICES

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 756 days.

(21) Appl. No.: 10/112,838

(22) Filed: Mar. 29, 2002

(51) Int. Cl.
  *G06F 1/26* (2006.01)
(52) U.S. Cl. ............... 713/161; 713/168; 713/200; 713/201
(58) Field of Classification Search ............... 713/161, 713/168, 200, 201
  See application file for complete search history.

(56) References Cited

U.S. PATENT DOCUMENTS

| 3,849,760 A | | 11/1974 | Endou et al. | |
|---|---|---|---|---|
| 4,670,749 A | * | 6/1987 | Freeman | 326/38 |
| 4,935,737 A | * | 6/1990 | Izbicki et al. | 326/39 |
| 5,084,636 A | | 1/1992 | Yoneda | |
| 5,121,359 A | | 6/1992 | Steele | |
| RE34,363 E | | 8/1993 | Freeman | |
| 5,237,218 A | | 8/1993 | Josephson et al. | |
| 5,237,219 A | | 8/1993 | Cliff | |
| 5,256,918 A | * | 10/1993 | Suzuki | 326/38 |
| 5,321,704 A | | 6/1994 | Erickson et al. | |
| 5,329,179 A | * | 7/1994 | Tang et al. | 326/39 |
| 5,341,034 A | | 8/1994 | Matthews | |
| 5,343,406 A | | 8/1994 | Freeman et al. | |
| 5,349,249 A | | 9/1994 | Chiang et al. | |
| 5,388,157 A | | 2/1995 | Austin | |
| 5,394,031 A | | 2/1995 | Britton et al. | |
| 5,457,408 A | | 10/1995 | Leung | |
| 5,598,424 A | | 1/1997 | Erickson et al. | |
| 5,768,372 A | | 6/1998 | Sung et al. | |
| 5,774,544 A | | 6/1998 | Lee et al. | |
| 5,838,901 A | | 11/1998 | Curd et al. | |
| 5,914,616 A | | 6/1999 | Young et al. | |
| 5,933,023 A | | 8/1999 | Young | |
| 6,028,445 A | | 2/2000 | Lawman | |
| 6,049,222 A | | 4/2000 | Lawman | |
| 6,172,520 B1 | | 1/2001 | Lawman et al. | |
| RE37,195 E | | 5/2001 | Kean | |

FOREIGN PATENT DOCUMENTS

| EP | 0253530 A2 | 6/1987 |
|---|---|---|
| WO | WO92/20157 | 11/1992 |
| WO | WO94/10754 | 11/1993 |
| WO | WO94/01867 | 1/1994 |

OTHER PUBLICATIONS

Xilinx Application Note, "Configuration Issues: Power-Up, Volatility, Security, Battery Back-Up", By Peter Alfke, XAPP 092, Nov. 24, 1997 (Version 1.1).

(Continued)

*Primary Examiner*—Thomas R. Peeso
(74) *Attorney, Agent, or Firm*—Arthur J. Behiel

(57) ABSTRACT

Described are methods and circuits of programming a programmable logic device with encrypted configuration data using one or more secure decryption keys. Configurable resources within PLDS in accordance with one embodiment are divided into first and second collections of configurable interconnect resources separated by a collection of switches. One collection of resources has access to one or more decryption keys required to decrypt the encrypted configuration data. The switches protect the proprietary keys by providing a secure boundary around the portion granted key access during the decryption process. Closing the switches after configuration clears user memory to prevent users from accessing stored versions of the proprietary keys.

24 Claims, 5 Drawing Sheets

OTHER PUBLICATIONS

Virtex Configuration Guide, published by Xilinx, Inc., 2100 Logic Drive, San Jose, CA 95124, Oct. 9, 2000 (Version 1.0).

Bruce Schneier "Applied Cryptography: Protocols, Algorithms, and Source Code in C", Second Edition, Copyright 1996, published by John Wiley & Sons, Inc.; Chapter 9, pp. 193-194, Chapter 10, 200-203 and p. 216; Chapter 12, pp. 265-301, Chapter 15, pp. 360-361, p. 456 and 483-502.

Cahners EDN ACCESS Web Page, "Cunning circuits confound crooks," Oct. 12, 2000; pp. 1-8; http://www.ednmag.com/ednmag/reg/2000/10122000/21df2.htm.

Xilinx, Application Note, XAPP138, "Virtex FPGA Series Configuration an Readback", published Oct. 4, 2000, available from Xilinx, Inc., 2100 Logic Drive, San Jose, California 95124.

Wolfgang Hoflich, Applications Note, "Using the XC4000 Readback Capability", XAPP 015.000, 1993, available from Xilinx, Inc., 2100 Logic Drive, San Jose, CA 95124, pp. 8-37 to 8-44.

Ann Duncan, Application Note, "DES Encryption and Decryption on the XC6216", available from Xilinx, Inc., 2100 Logic Drive, San Jose, CA 95124, XAPP 106, Feb. 2, 1998 (version 1.0), pp. 1-7.

"XC9500 In-System Programmable CPLD Family", available from Xilinx, Inc., 2100 Logic Drive, San Jose, CA 95124, Sep. 15, 1999 (version 5.0), pp. 1-16.

Product Specification, "XC18V00 Series of In-System Programmable Configuration PROMs", available from Xilinx, Inc., 2100 Logic Drive, San Jose, CA 95124, Nov. 12, 2001, DS026, (version 3.0), pp. 1-19.

Advanced Product Specification, "XC9500XV Family High-Performance CPLD", available from Xilinx, Inc., 2100 Logic Drive, San Jose, CA 95124, Jan. 15, 2001, DS049, (version 2.0), pp. 1-18.

"The Programmable Logic Data Book", published 1998, pp. 4-46 through 4-59, available from Xilinx, Inc. 2100 Logic Drive, San Jose, CA 95124.

"The Programmable Logic Data Book", published 1994, pp. 2-105, through 2-132, 2-231 through 2-235, available from Xilinx, Inc. 2100 Logic Drive, San Jose, CA 95124.

* cited by examiner

METHOD AND APPARATUS FOR PROTECTING PROPRIETARY DECRYPTION KEYS FOR PROGRAMMABLE LOGIC DEVICES

FIELD OF THE INVENTION

This invention relates generally to programmable logic devices, and in particular to methods and apparatus for encrypting data used to configure programmable logic devices to protect that data from theft.

BACKGROUND

FIG. 1 depicts an example of a chip set 100 that includes some general-purpose read-only memory (ROM) 110 connected to a general-purpose FPGA 120. FPGA 120 conventionally includes an array 130 that can be configured to implement custom functional circuitry 140. Array 130 typically includes a collection of configurable logic blocks (CLBs), memory blocks, and input/output blocks (IOBs) that can be interconnected using programmable interconnect resources.

A vendor may use a chip set similar to chip set 100 to supply any number of different circuit designs while stocking only a single general-purpose FPGA and some general-purpose memory. The vendor supplies a customer with a custom version of chip set 100 by simply programming ROM 110 with the configuration data required to implement the customer's desired functions.

Configuration data are typically downloaded into an FPGA (or other types of programmable logic devices) as a series of bits known as a configuration bitstream. Anyone having access to the configuration bitstream for a particular design can easily copy the design. In the foregoing example in which a vendor sells a custom circuit as a set of configuration data combined with a general-purpose FPGA, an unscrupulous customer could easily copy the configuration data and use it to program any number of additional FPGAs. Designs may also be stolen by reverse engineering the design from the configuration bitstream and then adapting the design for another FPGA or even a different circuit technology. Naturally, developers of custom configuration data for use in programmable chip sets are concerned for the security of their designs.

Some customers develop their own circuit designs and implement them on FPGAs. Designing complex circuits from basic logic gates, or "primitive cells," can be very time consuming. More complex functions called macros, or "cores," are therefore developed to represent more complex logic functions. These cores can then be used as building blocks for assembling still more complex circuit designs.

A number of core developers design and market cores for FPGAs and other types of programmable logic devices (PLDs). Customers purchase these cores and use them to program PLDs to achieve desired functions. For example, a collection of cores for implementing standard bus interfaces and signal-processing functions is available from Xilinx, Inc., of San Jose, Calif., under the name LogiCORE™. As with the configuration data in the example of FIG. 1, PLD cores and circuit designs that employ them are easily stolen. Core developers are therefore concerned for the security of their cores.

Some PLD manufactures address the security concerns of PLD customers and core developers by supporting bitstream encryption schemes. PLDs can include hard-wired or programmably instantiated decryptors that access decryption keys stored on the PLD in non-volatile memory. Proprietary bitstreams can then be encrypted for storage and delivery.

When PLDs support decryption circuits programmably instantiated on an FPGA, a clever thief can engineer a "Trojan Horse" design that, when instantiated, simply reads the decryption key and presents the key on an output pin of the FPGA. Steps should therefore be taken to prevent such designs from jeopardizing proprietary keys and the data they are intended to protect.

SUMMARY

The present invention is directed to programmable logic devices (PLDs) that can be configured to implement user circuits using encrypted configuration data. The configurable interconnect resources of a PLD in accordance with one embodiment includes first and second collections of interconnect resources separated by switches that define a secure boundary between the collections of resources.

Only one of the collections of interconnect resources is granted access to decryption keys required to decrypt the encrypted configuration data. The switches define a secure boundary around this collection of interconnect resources during configuration to prevent unscrupulous users from observing the proprietary keys. Closing the switches after configuration to reestablish communication between the collections of configurable resources automatically clears user memory to prevent users from accessing stored versions of the proprietary keys. In some embodiments, the input/output blocks of a PLD are disabled while proprietary keys are in use.

This summary does not limit the invention, which is instead defined by the claims.

DETAILED DESCRIPTION

Figure 1:
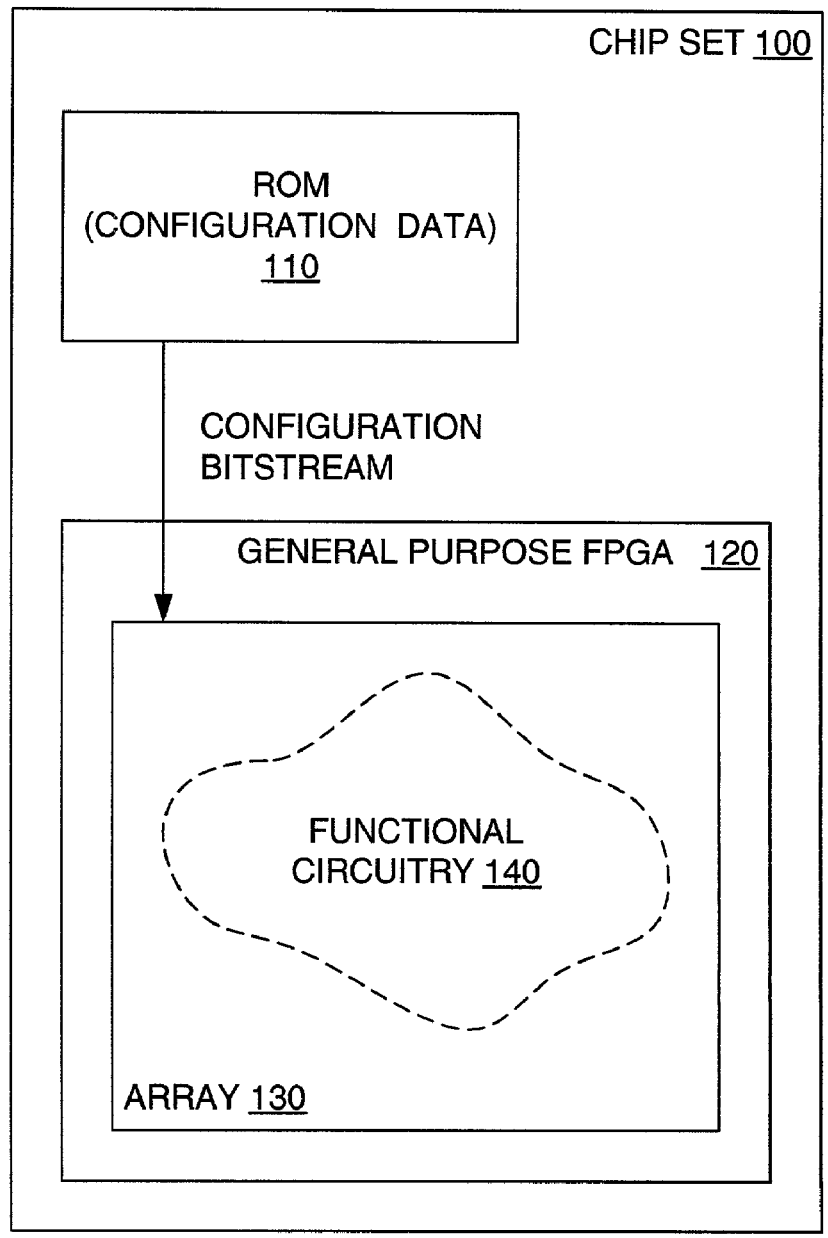
FIG. 1 depicts an example of a chip set 100 that includes some general-purpose read-only memory (ROM) 110 connected to a general-purpose FPGA 120.
Figure 2:
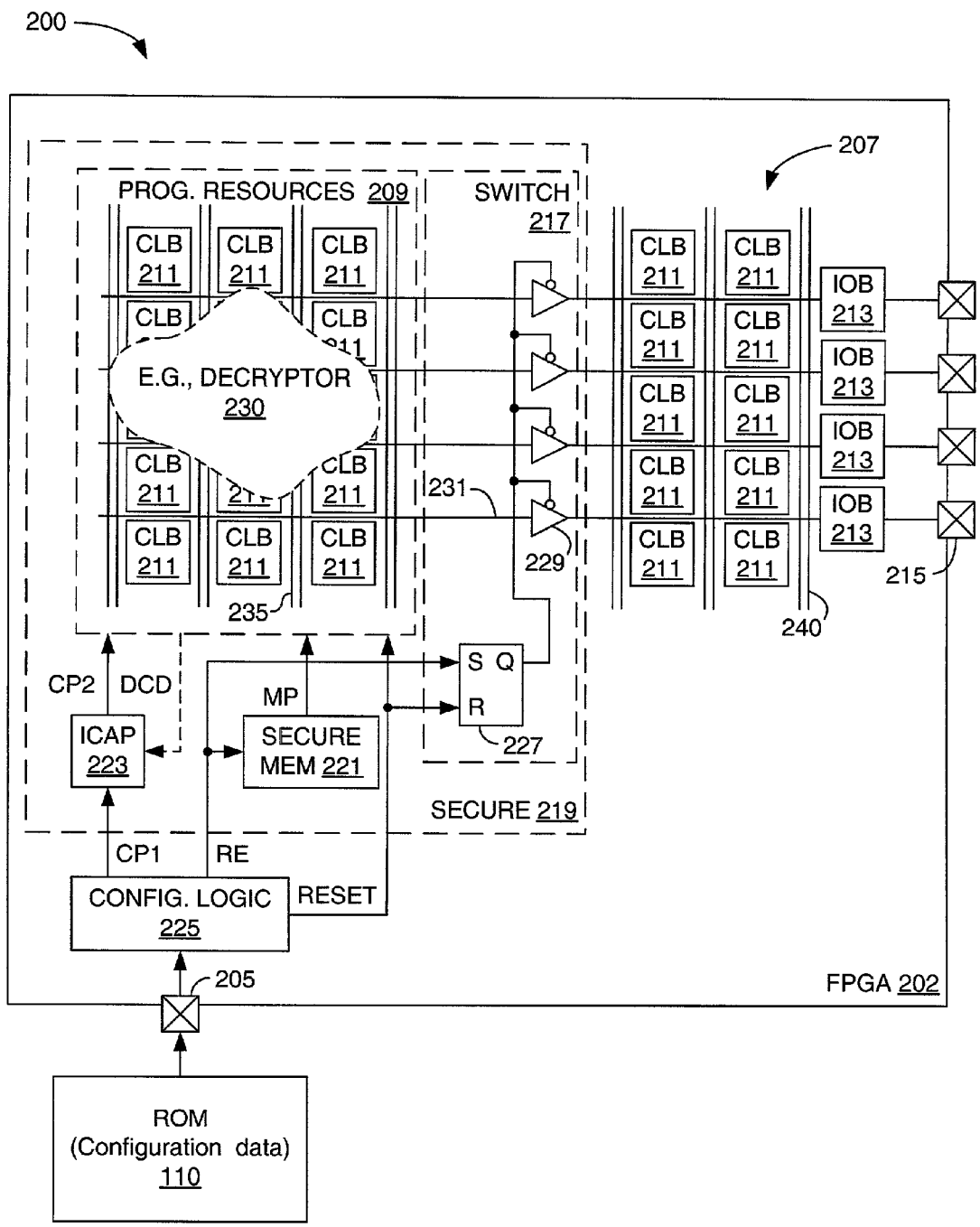
FIG. 2 depicts a system 200 that includes an FPGA 202 in accordance with an embodiment of the invention.

FIG. 2 depicts a system 200 that includes an FPGA 202 in accordance with an embodiment of the invention. FPGA 202 connects to a conventional configuration ROM 110 via an input pin 205, and includes respective first and second collections of programmable resources 207 and 209. Typical programmable resources include, for example, CLBs 211, IOBs 213, and block memory (not shown). IOBs 213 are conventionally connected to external input/output pins 215.

The configurable resources within FPGA 202 are divided into first collection 207 and second collection 209 via a switch circuit 217. Switch circuit 217 provides a secure boundary 219 around the second collection of programmable resources 209 to protect the contents of a secure memory 221. Secure boundary 219 also encompasses an internal configuration access port 223. Secure boundary 219 allows programmable resources 209 to access and manipulate proprietary data (e.g., decryption keys) without jeopardizing the proprietary data.

A conventional configuration logic circuit 225 outside secure boundary 219 can be used to configure both the first and second collections of programmable resources 207 and 209. Configuration logic 225 is connected to secure memory 221 via a read-enable line RE. Configuration logic 225 raises read-enable line RE to a logic one, thus enabling secure memory 221 to provide the proprietary contents to programmable resources 209 via a memory output port MP. The same read-enable line RE connects to the "set" terminal of a latch 227 within switch 217.

The read-enable signal on line RE changes the output of latch 227 to a logic one, and therefore disables a collection of tri-state buffers 229. Disabling buffers 229 disconnects a number of horizontal interconnect lines 231, and consequently separates programmable resources 209 from programmable resources 207. Resources 209 remain disconnected from resources 207 as long as the contents of secure memory 221 are available within secure boundary 219. Alternatively, the tri-state buffers can be replaced with OR gates or other logic gate, depending on the active polarity of the output of the latch or other logic that stores the condition that the secure memory is being accessed. When switch 217 is enabled, horizontal interconnect lines 231 can pass signals from resources 209 to resources 207. Although not shown, FPGA 202 includes bi-directional interconnect lines between regions 207 and 209. These too should be interconnected via switch 217. One-way interconnect lines extending from region 207 to 209 need not be switched, as they cannot convey proprietary data from regions 209.

It is possible to store the contents of secure memory 221 in some of the memory resources (e.g., the CLB's 211) within resources 209, and consequently have the proprietary contents of memory 221 available even after configuration logic 225 returns read-enable line RE low. Configuration logic 225 is therefore connected both to latch 227 and to each synchronous storage element within programmable resources 209. Tri-state buffers 229 are not enabled until the reset signal on line RESET clears the contents of latch 227 and the user memory elements within programmable logic 209. Alternatively, latch 227 can be implemented as part of configuration logic 225.

Figure 3:
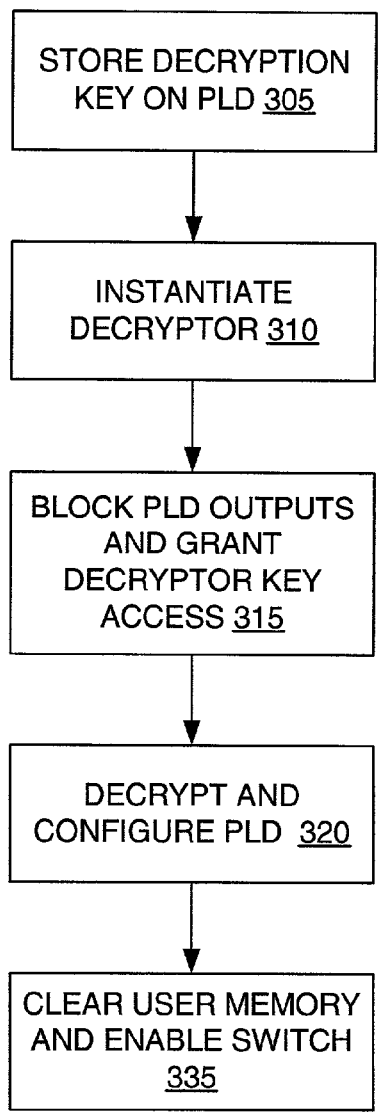
FIG. 3 is a flowchart 300 depicting a method of programming FPGA 202 of FIG. 2 using proprietary configuration data.

FIG. 3 is a flowchart 300 depicting a method of programming FPGA 202 of FIG. 2 using proprietary configuration data. This example assumes that the proprietary configuration data has been encrypted and stored in configuration ROM 110 with the unencrypted configuration data required to instantiate a decryptor in programmable resources 209.

First, the appropriate decryption key is stored in secure memory 221. The key is typically stored in some form of non-volatile memory (STEP 305). For a discussion of some acceptable forms of non-volatile memory, see U.S. patent application Ser. No. 09/724,652 entitled "PROGRAMMABLE LOGIC DEVICE WITH DECRYPTION ALGORITHM AND DECRYPTION KEY," by Pang. et al., and incorporated herein by reference.

Next, FPGA 202 is configured by first instantiating a decryptor 230. This configuration is conventionally accomplished by downloading a decryptor bitstream from ROM 110 via configuration logic 225 and internal configuration access port 223 (STEP 310). Many such decryptors are available, and the selection of one will depend upon the needs of the person selecting the decryptor. For a discussion of some suitable decryption techniques, see the U.S. patent application Ser. No. 09/253,401 entitled "Method and Apparatus for Protecting Proprietary Configuration Data for Programmable Logic Devices," by Stephen M. Trimberger, and incorporated herein by reference.

Decryptor 230 will have access to the proprietary contents of secure memory 221; consequently, in STEP 315 configuration logic 225 simultaneously enables secure memory 221 to provide the secure key on memory output port MP and sets latch 227 to disable all the tri-state buffers 229 in switch 217. Decryptor 230, now having access to the proprietary key in memory 221, receives the encrypted configuration data from ROM 110 through configuration logic 225 and internal configuration access port 223. Decryptor 230 decrypts the encrypted bitstream describing the user's circuit and provides the now decrypted configuration data back to internal configuration access port 223 via a decrypted-configuration-data port DCD (STEP 320). Once the user logic circuit is instantiated on FPGA 202, configuration logic 225 de-asserts the read-enable signal RE to memory 221 and then issues the reset signal on line RESET. The reset signal clears latch 227, and consequently re-enables communications between interconnect resources 235 within programmable resources 209 and interconnect resources 240 within programmable resources 207. In addition to facilitating communication between resources 207 and 209, the reset signal clears the contents of all CLBs, IOBs, and RAM blocks within secure region 219 (STEP 335). The FPGA is then operational.

Figure 4:
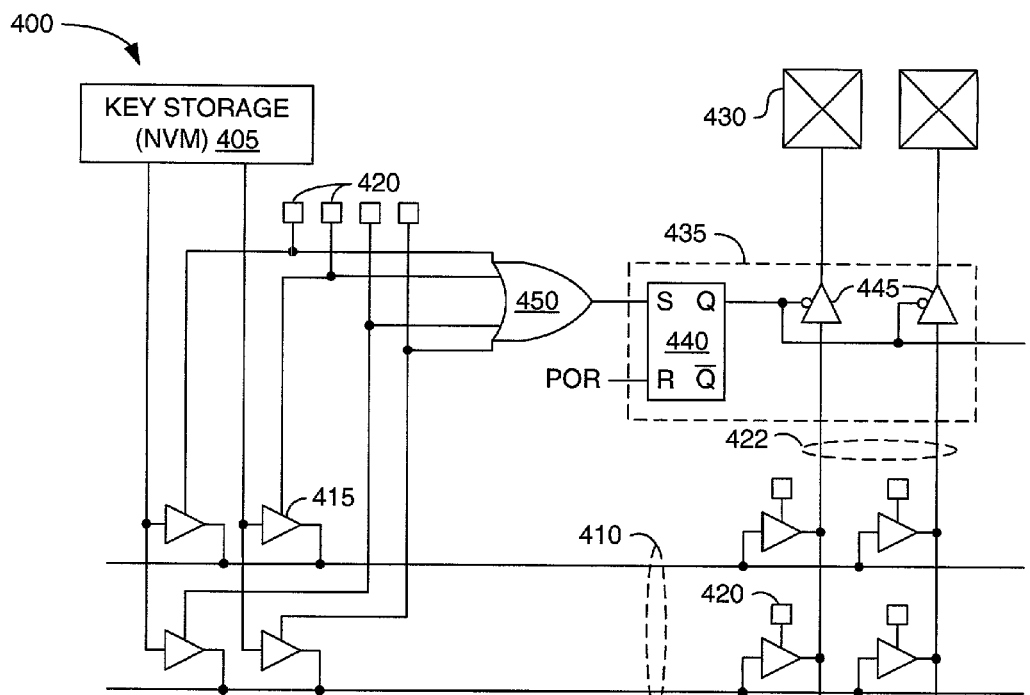
FIG. 4 depicts a portion of an FPGA 400 adapted in accordance with another embodiment of the invention.

FIG. 4 depicts a portion of an FPGA 400 adapted in accordance with another embodiment of the invention. FPGA 400 includes secure, non-volatile memory 405 programmably connectable to some portion of interconnect 410 via conventional programmable interconnect points (PIPS) 415. A conventional memory cell 420, typically a static RAM cell, controls each PIP 415. Horizontal interconnect lines 410 connect to vertical interconnect 422 via some additional PIPS. The depicted vertical interconnect lines 422 connect to external device pins 430 via a switch 435.

Switch 435 is similar to switch 217 of FIG. 2, and includes a latch 440 connected to a number of tri-state buffers 445. The "set" terminal of latch 440 connects to the output of an OR gate 450, the inputs of which are controlled by the memory cells 420 associated with key memory 405. The "reset" terminal of latch 440 connects to a line POR, which is controlled by a conventional power-on-reset signal used to clear all user resources on FPGA 400 when FPGA 400 is either reset or powered up.

Setting the memory cells 420 associated with PIPS 415 connects the output of key memory 405 to interconnect lines 410 and, potentially, to interconnect lines 422. OR gate 450 produces a logic one in response to the signals from memory cells 420, and consequently sets latch 440. Latch 440 thus produces a logic one output to tri-state buffers 445, and consequently disconnects output pins 430 from all internal resources of FPGA 400. Thus, while the proprietary information within memory 405 is available to the routing and other resources within FPGA 400, the proprietary data in memory 405 and any data derived from the proprietary data are not available on pins 430. Latch 440 and all other user memory elements are reset to erase any proprietary data stored in user memory before tri-state buffers 445 re-establish the connections between pins 430 and interconnect lines 422.

Figure 5:
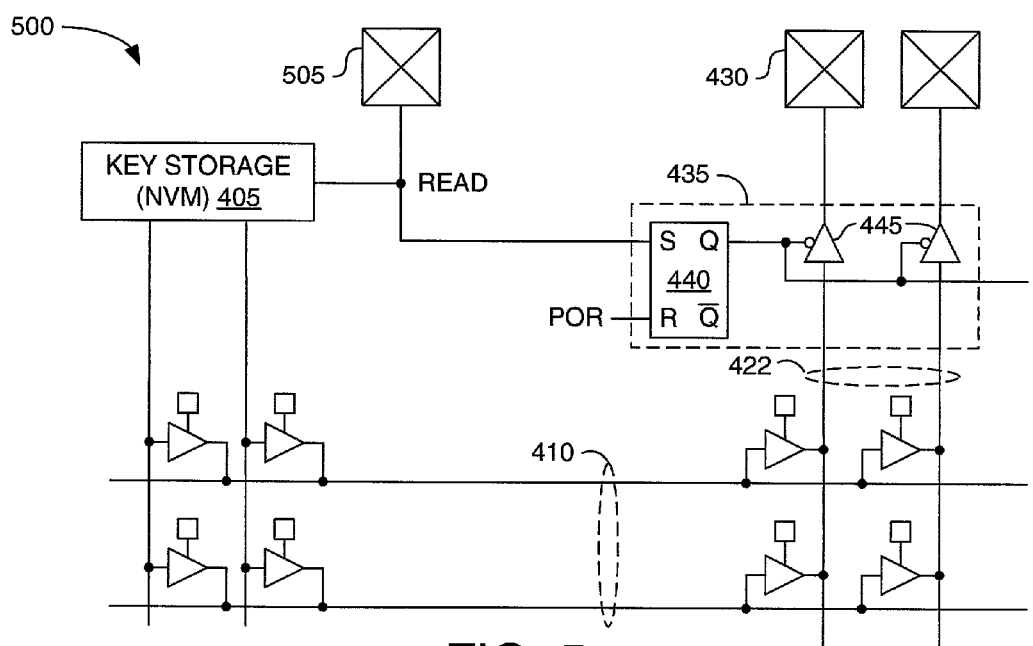
FIG. 5 depicts a portion of an FPGA 500 adapted in accordance with another embodiment.

FIG. 5 depicts a portion of an FPGA 500 adapted in accordance with another embodiment. FPGA 500 is similar to FPGA 400 of FIG. 4, like-numbered elements being the same. In FPGA 500, a user makes the contents of key storage 405 available to interconnect resources 410 and 422 by issuing a read-enable signal READ via a device input pin 505. Read-enable signal READ may also be generated internally and provided to memory 405 and latch 440 via the device interconnect. As with FPGA 400, enabling a read from memory 405 sets latch 440, and consequently disconnects output pins 430 for the duration of the availability of the proprietary contents of memory 405. Resetting latch 440 and any other user logic within FPGA 500 then reestablishes communication between interconnect resources 425 and output pins 430. In one embodiment, tri-state buffers 445 are each part of input/output blocks.

Conventional programmable logic devices, such as the Virtex-II™ series of FPGAs available from Xilinx, Inc., of San Jose, Calif., include hard-wired decryptors that can be used in conjunction with non-volatile or battery-backed-up decryption key memory to secure core designs. Hard-wired decryptors are typically of the symmetrical type, as these are simpler—and consequently less real-estate intensive—than are decryptors that use public/private key algorithms. Core designers who develop cores for these designs therefore rely upon keys stored in non-volatile memory on FPGAs to secure their designs.

Unfortunately, users wishing to change from one circuit design to another may have to update the key stored in secure memory on the FPGA; otherwise, the FPGA will not be able to decrypt the new design. Core designers must therefore trust others with their key, or program the FPGAs themselves, to facilitate this type of upgrade. A better solution would be to allow users to update the key themselves without jeopardizing the key's integrity.

Figure 6:
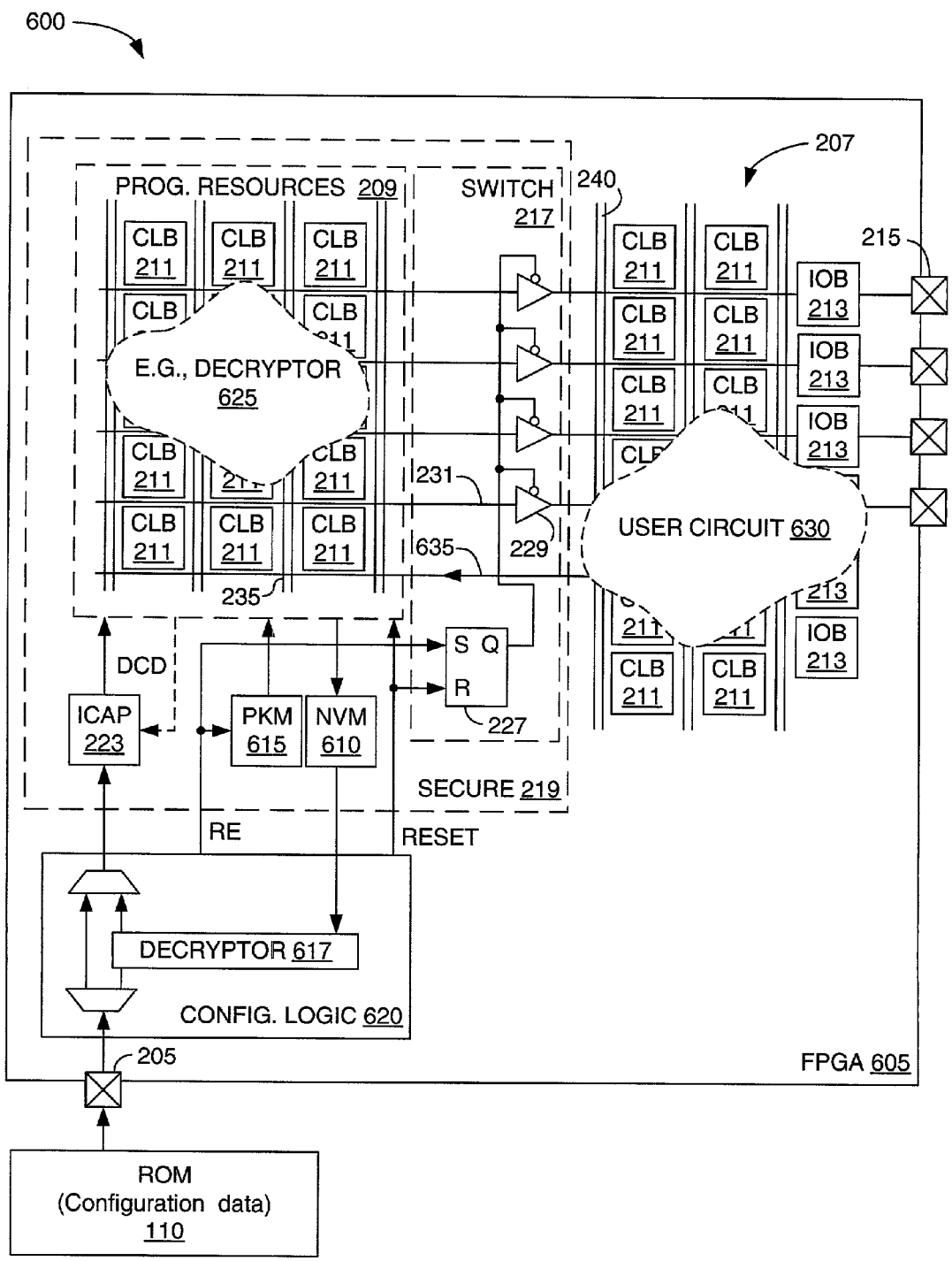
FIG. 6 depicts an FPGA 600 adapted to allow users to upgrade decryption keys without knowing the keys.

FIG. 6 depicts an FPGA 600 adapted to allow users to upgrade decryption keys without knowing the keys. FPGA 600 is similar to FPGA 200 of FIG. 2, like-numbered elements being the same. Those elements discussed above in connection with FIG. 2 are not discussed here for brevity.

System 600 allows core developers to convey proprietary decryption keys to customers without jeopardizing the security of such keys. System 600 includes an FPGA 605 that includes two non-volatile key memories 610 and 615. Non-volatile memory 610 conventionally conveys a configuration key (i.e., a key for decrypting configuration bitstreams) to a hard-wired decryptor 617 within configuration logic 620. Configuration logic 620 is similar to that available in the Xilinx Virtex-II™ FPGAs, and allows configuration bitstreams from an input pin 205 to either go directly to an internal configuration access port 223 or to internal configuration access port 223 via decryptor 617. Configuration logic 620 is modified in accordance with the invention to facilitate secure updating of the decryption keys stored in non-volatile memory 610.

Private key memory 615 includes one or more very secure decryption keys that are preferably manufactured into FPGA 605. The private keys stored in memory 615 have corresponding public counterparts that can be used to encrypt data. The resulting encrypted data can only be decrypted using the corresponding private counterpart in memory 615. The user can then instantiate a decryptor 625 into programmable resources 209 to decrypt the encrypted key using one or more private keys within memory 615, thereby enabling decryptor 625 to insert the resulting decrypted key into non-volatile memory 610. As in the examples of FIGS. 2 through 5, switch 217 disables the outputs from secure area 219 to insure that the contents of private key memory 615 remain secure. The same precaution need not be taken for non-volatile memory 610, as non-volatile memory 610 outputs its contents only to the hard-wired decryptor 617. In other embodiments, non-volatile memory 610 might provide its output to a decryptor instantiated in programmable logic, and might therefore include the same types of protection afforded the contents of memory 615. Public-key and other forms of cryptography are detailed in "Applied Cryptography, Second Edition: Protocols, Algorithms, and Source Code in C," by Bruce Schneier (1997), particularly at pages 483–502, which is incorporated herein by reference.

Decryptor 625 is complex relative to decryptor 617 because of the complexity of the private/public key algorithm implemented by decryptor 625. The complexity of decryptor 625 would require significant device real estate if not for the fact that decryptor 625 is instantiated using programmable resources that are written over when FPGA 605 is reconfigured to include the user design of interest.

FPGA 600 is shown to include a user circuit 630 instantiated using the non-secure programmable resources 207. User circuit 630 connects to programmable resources 209 via a one-way interconnect line 635 that extends across secure boundary 219. Interconnect line 635 bypasses switch 217 without compromising key security because line 635 cannot convey signals out of secure boundary 219. For example, user circuit 630 might be a data-decompression circuit disposed between pin 205 and configuration logic 620 to decompress compressed configuration data. Alternatively, user circuit 630 might support a particular data interface, such as the standard PCI interface.

The foregoing circuits and methods afford some protection against "Trojan Horse" designs. For additional methods and circuits useful for this purpose, see co-pending application Ser. No. 10/112,790, filed herewith and entitled "SYSTEMS FOR PROTECTING PROPRIETARY CONFIGURATION DATA FOR PROGRAMMABLE LOGIC DEVICES," by Stephen M. Trimberger, which is incorporated herein by reference.

While the present invention has been described in connection with specific embodiments, variations of these embodiments will be obvious to those of ordinary skill in the art. For example, 1. some FPGAS might be programmed with additional keys to support multiple decryptors;
2. CLBs in the secure area may be different than other CLBs in the FPGA;
3. the switches that protect secure areas can be implemented in many ways (e.g., gates, pass transistors, multiplexers, to name just a few); and
4. the configuration setup may include two-way communication between the configuration memory and the logic to ensure the decryptor is an authorized one.

Moreover, some components are shown directly connected to one another while others are shown connected via intermediate components. In each instance the method of interconnection establishes some desired electrical communication between two or more circuit nodes, or terminals. Such communication may often be accomplished using a number of circuit configurations, as will be understood by those of skill in the art. Therefore, the spirit and scope of the appended claims should not be limited to the foregoing description.

The invention claimed is:

1. A programmable logic device comprising:
   a. configurable interconnect resources;
   b. configurable logic elements programmably connectable to the interconnect resources;
   c. configurable output pins programmably connectable to the interconnect resources;

d. a memory adapted to store proprietary data and connectable to the interconnect resources; and e. a switch connected to the interconnect resources between the memory and the output pins and adapted to disconnect the memory from the output pins when the memory is accessed.

2. The programmable logic device of claim 1, wherein the output pins connect to configurable input/output blocks.

3. The programmable logic device of claim 2, wherein the input/output blocks include output drivers, and wherein the switch disables the output drivers when the memory is accessed.

4. The programmable logic device of claim 1, wherein the switch disconnects a first portion of the interconnect resources from a second portion of the interconnect resources.

5. The programmable logic device of claim 1, wherein the memory is non-volatile memory.

6. The programmable logic device of claim 1, wherein the proprietary data comprises at least on decryption key.

7. A programmable logic device comprising:

a. device output pins adapted to convey signals from the programmable logic device;

b. a first collection of programmable logic resources including a first collection of interconnect resources programmably connected to the device output pins;

c. a non-volatile memory adapted to store at least one decryption key and having a read-enable terminal and a memory-output port;

d. a second collection of programmable logic resources connected to the memory-output terminal, the second collection of programmable logic resources including a second correction of interconnect resources; and e. at least one switch disposed between the first and second collections of programmable logic resources and adapted to selectively connect the first and second collections of programmable logic resources, the switch including a switch control terminal.

8. The programmable logic device of claim 7, wherein the switch control terminal connects to the read-enable terminal.

9. The programmable logic device of claim 7, wherein the switch further comprises a memory element having a memory-element reset terminal.

10. The programmable logic device of claim 7, the switch further comprising a switch reset terminal connected to the memory-element reset terminals.

11. The programmable logic device of claim 7, wherein the switch comprises a tri-state buffer.

12. The programmable logic device of claim 11, further comprising a programmable input/output block that includes the tri-state buffer.

13. The programmable logic device of claim 7, further comprising a configuration access port.

14. The programmable logic device of claim 13, wherein the second collection of programmable logic is configured to include a decryptor, the decryptor including:

a. an input terminal adapted to receive encrypted configuration data; and b. an output terminal connected to the configuration access port.

15. A method of configuring a programmable logic device to perform a desired logic function, the method comprising:

a. storing a decryption key on the programmable logic device;

b. configuring logic and interconnect resources within the programmable logic device to provide a decryptor;

c. granting the decryptor access to the decryption key while blocking external access to the interconnect resources;

d. decrypting the encrypted configuration data to produce decrypted configuration data representing the desired logic function; and e. configuring the programmable logic device to perform the desired logic function using the decrypted configuration data.

16. The method of claim 15, further comprising barring access to the decryption key after configuring the programmable logic device to perform the desired logic function and then granting external access to the interconnect resources.

17. The method of claim 15, further comprising removing the decryptor after decrypting the encrypted configuration data.

18. The method of claim 15, wherein blocking external access to the interconnect resources includes disabling output pins on the programmable logic device.

19. The method of claim 15, wherein configuring the programmable logic device to include a decryptor comprises providing a bitstream representing the decryptor to the programmable logic device.

20. A method of writing proprietary configuration data representing a user logic circuit to a programmable logic device, the method comprising:

a. encrypting the proprietary configuration to create an encrypted circuit representation, wherein the encrypted circuit representation can be decrypted using a configuration key;

b. storing a private key on the programmable logic device;

c. configuring the programmable logic device to include a decryptor that decrypts proprietary data using the private key and that employs a public/private key decryption algorithm;

d. encrypting a configuration key using the public key corresponding to the private key on the programmable logic device to produce an encrypted configuration key;

e. sending the encrypted configuration key to the decryptor;

f. decrypting the encrypted configuration key using the private key to recreate the configuration key in the programmable logic device;

g. conveying the encrypted circuit representation to the programmable logic device; and h. decrypting the encrypted circuit representation, on the programmable logic device, using the recreated configuration key.

21. The method of claim 20, further comprising storing the recreated configuration key in non-volatile memory.

22. The method of claim 20, wherein the programmable logic device include programmable output pins, the method further comprising disabling the output pins while accessing the private key and the configuration key.

23. The method of claim 22, further comprising resetting at least a portion of the programmable logic device while preserving the recreated configuration key in non-volatile memory.

24. The method of claim 23, wherein resetting at least a portion of the programmable logic device comprises clearing volatile storage elements on the programmable logic device.

* * * * *